United States Patent
Golovchenko et al.

(10) Patent No.: US 6,259,543 B1
(45) Date of Patent: Jul. 10, 2001

(54) EFFICIENT METHOD FOR ASSESSING THE SYSTEM PERFORMANCE OF AN OPTICAL TRANSMISSION SYSTEM WHILE ACCOUNTING FOR PENALTIES ARISING FROM NONLINEAR INTERACTIONS

(75) Inventors: Ekaterina A. Golovchenko; Alexei N. Pilipetskii, both of Colts Neck, NJ (US)

(73) Assignee: TyCom (US) Inc., Morristown, NJ (US)

( * ) Notice: Subject to any disclaimer, the term of this patent is extended or adjusted under 35 U.S.C. 154(b) by 0 days.

(21) Appl. No.: 09/251,501

(22) Filed: Feb. 17, 1999

(51) Int. Cl.[7] .............................. H04B 10/00; H04B 10/08
(52) U.S. Cl. .......................... 359/110; 359/161; 359/173
(58) Field of Search .......................... 359/110, 124–134, 359/177, 161, 173

(56) References Cited

U.S. PATENT DOCUMENTS

| | | | |
|---|---|---|---|
| 5,774,242 | * 6/1998 | O'Sullivan | 359/110 |
| 6,008,916 | * 12/1999 | Khaleghi | 359/110 |
| 6,069,718 | * 5/2000 | Khaleghi | 359/110 |
| 6,825,521 | * 10/1998 | Ogawa | 359/161 |

OTHER PUBLICATIONS

Golovchenko, E.A. "Resonances in four-wave mixing penalties in long-haul WDM transmission links" Sep. 1998, ECOC 98, pp. 311–312.*

Golovchenko, E.A. "Modeling of transoceanic fiber-optic WDM communication systems" Sep. 1999, IEEE, pp. 337–347.*

Bergano, N.S. "Circulating loop transmission experiments for the study of long-haul transmission systems using erbium doped fiber amplifiers" May 1994, IEEE, pp. 879–888.*

* cited by examiner

Primary Examiner—Leslie Pascal
Assistant Examiner—Agustin Bello

(57) ABSTRACT

A method is provided for determining the system performance of an optical transmission system that supports an optical signal having a plurality of channels. The method begins by selecting a set of parameters defining characteristics of the transmission system. Exemplary parameters include, for example, the system's length, bit rate, the number of amplifiers and channels employed, and the wavelengths of the channels and their respective power levels. The method continues by determining a baseline value of the system performance that accounts for fiber loss, optical amplifier gain and noise, and system gain equalization. Next, a first penalty to the baseline system performance is determined. The first penalty arises from a nonlinear interaction between the optical signal and amplified spontaneous emission. A second penalty to the baseline system performance is then determined. The second penalty arises from self-phase modulation and cross-phase modulation. Finally, the first and second penalties are subtracted from the baseline system performance to obtain a value of system performance for the transmission system.

6 Claims, 2 Drawing Sheets

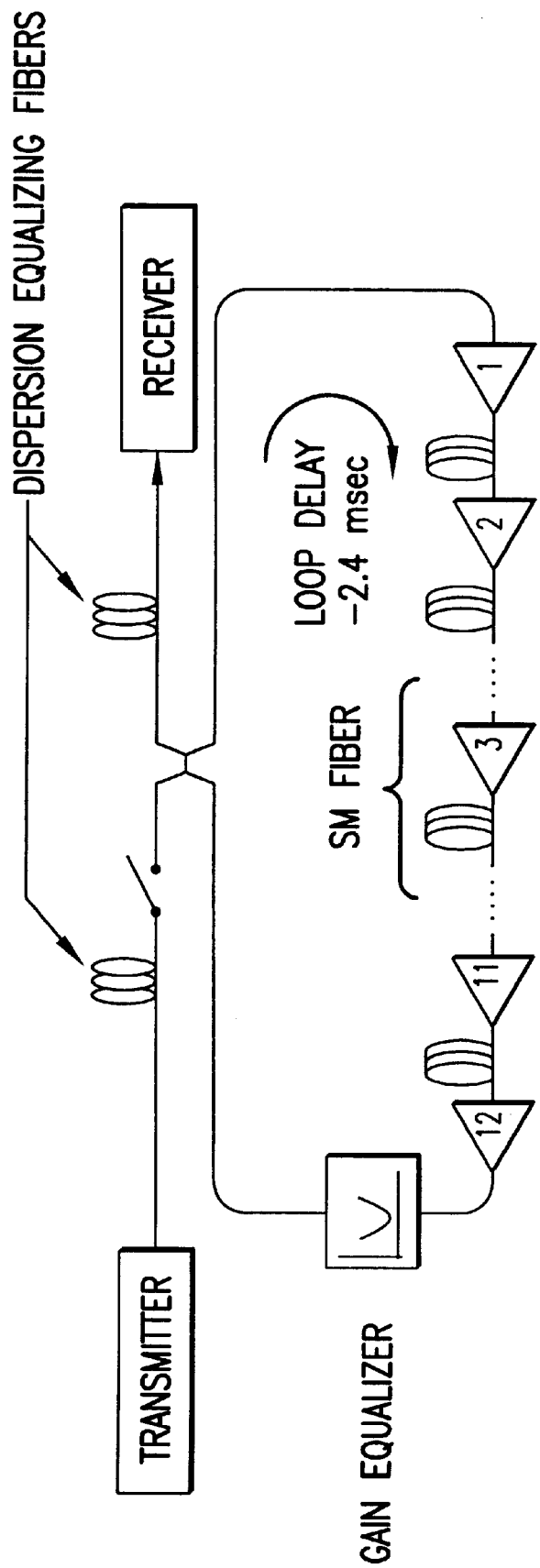
FIG.2 BLOCK DIAGRAM OF THE TRANSMISSION EXPERIMENT.

US 6,259,543 B1

EFFICIENT METHOD FOR ASSESSING THE SYSTEM PERFORMANCE OF AN OPTICAL TRANSMISSION SYSTEM WHILE ACCOUNTING FOR PENALTIES ARISING FROM NONLINEAR INTERACTIONS

FIELD OF THE INVENTION

The present invention relates generally to methods for modeling the performance of optical transmission systems, and more particularly, to a method for modeling the performance of an optical transmission system that takes into account nonlinear effects.

BACKGROUND OF THE INVENTION

Commercial lightwave systems use optical fibers to carry large amounts of multiplexed digital data over long distances from a transmit terminal to a receive terminal. The maximum distance that the data can be transmitted in the fiber without amplification or regeneration is limited by the loss and dispersion associated with the optical fiber. To transmit optical signals over long distances, the lightwave systems may include a number of repeaters periodically located along the fiber route from the transmit terminal to the receive terminal. Each repeater boosts the weak received signal to compensate for the transmission losses which occurred from the last repeater. Prior to the widespread availability of efficient optical amplifiers, many systems converted the optical signals into electrical signals for amplification by conventional electrical amplifiers. The amplified electrical signals were then reconverted to the optical domain, for further distribution along the optical communication path. The advent of reliable and low cost optical amplifiers has obviated the need to convert signals into the electrical domain for amplification.

Optical amplifiers, such as rare earth doped optical fiber amplifiers, require a source of pump energy. In a rare earth doped optical fiber amplifier, for example, a dedicated pump laser is coupled to the doped fiber for exciting the active medium (rare earth element) within the amplifier. At the same time, a communication signal is passed through the doped fiber. The doped fiber exhibits gain at the wavelength of the communication signal, providing the desired amplification. If the doped optical fiber is doped with erbium, for example, pump energy may be provided at a wavelength of 1485 nm or 980 nm, which coincide with the absorption peaks of erbium.

Signals on optical fiber transmission lines characterized by large bit rate distance products, such as undersea or transcontinental terrestrial lightwave transmission systems and which employ optical amplifiers are subject to a host of impairments that accumulate along its length. The source of these impairments within a single data channel include amplified spontaneous emission (ASE) noise generated in the erbium-doped fiber amplifiers (EDFAs), polarization dependent gain caused by hole burning in the EDFAs, polarization dependent loss (PDL) in the passive components, nonlinear effects resulting from the dependence of the refractive index of single-mode fiber on the intensity of the light propagating therethrough, and chromatic dispersion, which causes different optical frequencies to travel at different group velocities. In addition, for wavelength division multiplexed (WDM) systems in which a plurality of optical channels are transmitted on the same optical fiber, crosstalk between channels caused by the fiber's nonlinear index or incomplete channel selection at the receiving terminal must be considered.

The degree to which these impairments effect the performance of the transmission system will be determined by the operating characteristics of the transmission system such as its length, the number of amplifiers and channels employed, and the individual channel wavelengths and power levels. In designing such a system it would clearly be advantageous to be able to simulate the effects of impairments arising from a given set of operating characteristics in order to predict the transmission system's performance. Unfortunately, to adequately model WDM systems while taking into account nonlinear penalties is computationally complex and time-consuming, and is thus often impractical.

SUMMARY OF THE INVENTION

The present invention provides a method for determining the system performance of an optical transmission system that supports an optical signal having a plurality of channels. The method begins by selecting a set of parameters defining characteristics of the transmission system. Exemplary parameters include, for example, the system's length, bit rate, the number of amplifiers and channels employed, and the wavelengths of the channels and their respective power levels. The method continues by determining a baseline value of the system performance that accounts for fiber loss, optical amplifier gain and noise, and system gain equalization. Next, a first penalty to the baseline system performance is determined. The first penalty arises from a nonlinear interaction between the optical signal and amplified spontaneous emission. A second penalty to the baseline system performance is then determined. The second penalty arises from self-phase modulation and cross-phase modulation. Finally, the first and second penalties are subtracted from the baseline system performance to obtain a value of system performance for the transmission system.

The present invention advantageously models the performance of an optical transmission system to a reasonable level accuracy. Moreover, the method can be executed in a relatively short amount of time, even on a personal computer.

BRIEF DESCRIPTION OF THE DRAWINGS

FIG. 2 is a schematic diagram of a circulating loop transmission system that was modeled in accordance with the techniques of the present invention.

DETAILED DESCRIPTION

Figure 1:
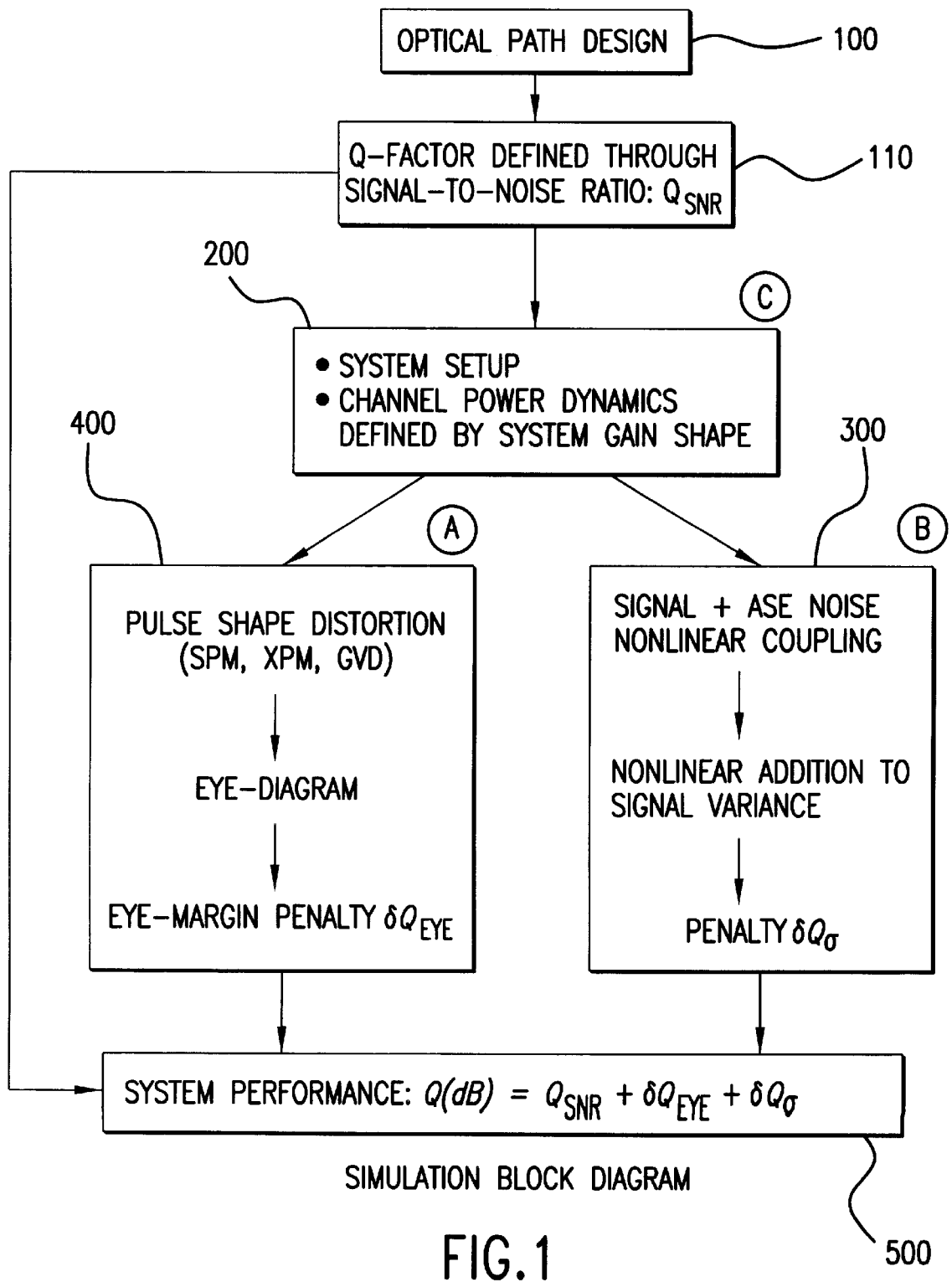
FIG. 1 is a flowchart of the steps performed in accordance with the present invention for determining system performance.

The present invention evaluates system performance in terms of the Q factor, which is a measure of performance that can be related to both the bit error rate (BER) and the signal-to-noise ratio. The bit error rate is defined as the ratio of the number of erroneously received bits to the total number of bits received per second. When the bit error rate is very low (for example, $10^{-14}$ or less), its measurement is time-consuming. However, in these cases the Q-factor can be more readily determined. The Q-factor is equivalent to a signal-to-noise measure at the electrical decision threshold point in the receiving terminal and is defined as:

$$Q = |\mu_1 - \mu_0|/(\sigma_1 + \sigma_0)$$

where $\mu_1$ and $\mu_0$ are the mean voltage values of the ones and zero rail of the decision circuit, and $\sigma_1$ and $\sigma_0$ are the standard deviation of the noise voltage on these rails. If the decision threshold point is optimally set between the rails, the BER corresponding to Q is given by $$BER = [1/(Q\sqrt{2\pi})]\exp(-Q^2/2)$$

FIG. 1 shows a flowchart of the steps performed in accordance with the present invention to determine system performance in terms of the Q-factor. In summary, a baseline Q factor is determined which ignores nonlinear interactions (other than signal-signal-signal four-wave mixing) such as pulse shape distortions that arise from self-phase modulation (SPM) and cross-phase modulation (XPM) and nonlinear interactions between the signal and ASE noise. The inventors have surprisingly determined that these nonlinear interactions may be treated as penalties to the baseline Q factor. Specifically, the nonlinear interactions may be independently evaluated through separate computations to determine changes in the Q factor that simply may be subtracted from the baseline Q. By avoiding the need for determining Q in a single calculation that simultaneously accounts for all pertinent interactions, the computational complexity of the problem is greatly reduced.

The process begins in step 100 by providing a set of parameters for the particular optical transmission path undergoing analysis. These parameters include the total path length, the number and the specifications of amplifiers and equalizers, the number of WDM channels employed, the individual channel wavelengths and power levels, the bit rate, and the specifications of the fibers comprising the spans between the amplifiers.

In step 110 the parameters provided in step 100 are used as inputs to calculate a baseline Q factor for each channel. The baseline Q treats each transmission span as comprising a loss element, i.e., the fiber, and an element providing both gain and noise, i.e., the optical amplifier. The dominant noise source is assumed to arise from amplified spontaneous emission noise. Noise accumulation in the system is assumed to be linear. Amplifier performance is simulated by the Saleh amplifier model, which provides the amplifier gain shape over the system bandwidth. Characteristics of the transmitter and receiver are also taken into account, in particular, electrical impairments that effect system performance. Details concerning the calculation of the baseline Q, taking into account the previously mentioned parameters, may be found in Marcuse, "Derivation of Analytical Expressions for the Bit-Error- Probability in Lightwave Systems with Optical Amplifiers," J. of Lightwave Technol., vol. 8, pp.1816–1823, 1990, which is hereby incorporated by reference..

The baseline Q factor determined in step 110 also takes into account four-wave mixing among the data channels, which gives rise to optical power at wavelengths other than the interacting channel wavelengths. This power is uncorrelated with the data being transmitted at the channel wavelengths and thus may be treated as another component of noise. In particular, significant resonances in the power of the four-wave mixing products can occur as the channel separation is varied. These resonances are the result of periodicities in the amplifier spacing, distribution in dispersions and the lengths of the fiber spans. Details concerning the calculation of the effects of four-wave mixing on the baseline Q factor may be found in E. A. Golovchenko et al., ECOC'98, 1998, paper TuC27.

In step 200 the individual channel power dynamics are determined based on the previously calculated amplifier gain shape. That is, the relative power levels for each channel in each span are determined based on the different amounts of gain imparted to each channel and any preemphasis and gain equalization which may be applied to the channels. The power dynamics as determined in this step are used as input values to the calculations of the nonlinear interactions in steps 300 and 400.

In step 300 the penalty to the Q factor caused by the nonlinear interaction between the individual channels of the signal and ASE noise is calculated. It has been shown both analytically and experimentally that as a result of ASE noise-signal interactions, the signal variance of an intensity modulated signal propagating through an optical fiber may increase for those channels that experience a positive path average dispersion (D>0) and that the signal variance may decrease for those channels experiencing a negative path average dispersion (D<0) depending on the post-dispersion compensation schematic. The latter circumstance is referred to as the noise squeezing regime. More detailed discussions of ASE noise-signal interactions may be found in Hui et al., Electron Lett, 32, 2001, (1996) and Midrio et al., Electron Lett, 33, 1066, (1997), and V. J. Mazurczyk, A. Pilipetskii, and C. J. Chen, OFC'98 paper WM33, for example, which are both hereby incorporated by reference. A more detailed discussion of the particular impact on the pulse shape caused by the nonlinear interaction between the signal and ASE noise may be found in copending U.S. Appl. Ser. No. 09/204,044. As discussed in the previously mentioned references, a transfer-matrix approach may be used to calculate the impact on the signal variance of the nonlinear interaction between the signal, which is treated as a cw wave, and ASE noise.

Next, in connection with step 400, time domain effects are taken into account by considering self phase modulation (SPM) and cross phase modulation (XPM). As with the nonlinear processes accounted for in steps 200 and 300, SPM and XPM arise from the small intensity dependent component of the optical fiber's refractive index, which causes the refractive index to vary as the intensity varies. A single pulse traveling in an optical fiber creates, through the nonlinear component of the refractive index, a variation in the total index proportional to its own intensity. Thus, a time variation in the pulse intensity will lead to a self-chirping of the pulse; this phenomenon is self phase modulation. If a second pulse of light at another frequency is present such that the pulses are temporally coincident, the refractive index change induced in the fiber by the second pulse will be "seen" by the first pulse (and vice versa). The change in index experienced by the first pulse due to the second will cause further chirping. This phenomenon is referred to as cross-phase modulation.

In step 400 the penalty to the Q factor arising from cross-phase modulation and self-phase modulation is treated as an independent factor on the system performance. The effects of XPM and SPM are manifest as an adverse effect on the eye margin. This impact on the eye margin may be determined by the following method. First the propagation of WDM pulse sequences with the characteristics defined by the transmitter specifications is simulated by a well known split-step noiseless technique. At the receiver end the test channel is filtered out and the time dependence of the signal after an electrical filter I(t) is calculated. We then compare received eye margin to undistorted NRZ eye margin in order to calculate eye-margin penalty to Q value obtained from base-line noise accumulation simulation. To do so we calculate the time average value <I(t)>. The height of undistorted NRZ ones rail is defined as:

$$I_{NRZ} = N_b/N_1 <I>,$$

where $N_b$ is total number of bits in the simulation, and $N_1$ is the number of ones. The eye penalty to Q(dB) can be roughly estimated as:

$$\delta Q(\mathrm{dB}) = 10 * \log_{10}[(I_1 - I_0)/I_{NRZ}]$$

where $I_1$ is the lowest ones rail and $I_0$ is the highest zero rail. For the purposes of design optimization a single channel simulation which accounts only for SPM can be used. This allows to significantly speed up the design process. The final eye-margin penalty is the defined through WDM simulation.

Finally, in step 500, the total Q factor is determined by adding to the baseline Q determined in step 110 the Q factor penalties determined in steps 300 and 400.

FIG. 2 is a schematic diagram of a transmission system arranged in a circulating loop configuration that was modeled in accordance with the present invention so that the results may be compared to experiments. The amplifier chain was assembled from eleven spans of dispersion-managed transmission fiber with an average span length of 45 km, and twelve 980 nm pumped EDFAs. The total loop length was 497 km. The amplifiers were designed to have an output power up to +9 dBm and a low noise figure (NF≈4 dB). The average dispersion of the first 5 spans was –2 ps/nm-km, the sixth span has a dispersion of +17 ps/nm–km fiber, and the final 5 spans again employed fiber having a dispersion of –2 ps/nm-km. The zero dispersion wavelength of the overall amplifier chain was 1552 nm, and the average fiber loss was 0.21 dB/km. The system used a single gain equalization section which consisted of long-period-grating filters.

The transmission process used chirped return-to-zero (CRZ) pulses that were transmitted at 10 GB/s. CRZ pulses were formed by applying bit-synchronous amplitude and phase modulation to NRZ optical data with an absolute value of phase modulation index of $0.6\pi$ for all the WDM channels. The channels were evenly spaced apart by about 0.6 nm over a wavelength range from 1547.5 ($\lambda_1$) to 1556.5 ($\lambda_{16}$) nm. For the BER measurement the performance of each channel was optimized by pre- and post-dispersion compensation.

The results of the experiment are compared to the simulated results in FIGS. 3 and 4. FIG. 3 shows the measured and the simulated gain shape for a single pass through the loop. This agreement is important in the simulation process since the nonlinear penalties experienced by individual channels depend on the optical power.

FIG. 4 shows the measured and computed eye diagrams for channel 8 at $\lambda_8$ =1551.7 nm measured with 30 GHz of bandwidth. FIG. 4 shows a good agreement between the measured and simulated eye diagrams. A comparison between the measurements and simulations was used to verify the eye-margin calculation. The differences between measurements and modeling are due primarily to timing jitter which was not incorporated into the model. The total dispersion at 7,500 km for this channel was –150 ps/nm, and it did not require pre- or post-dispersion compensation for optimal performance.

FIGS. 3 and 4 demonstrate that the individual components of the simulation closely agree with the experimental data Based on these individual components, the Q-factor was calculated for a 16×10 Gb/s WDM transmission system having a total length of over 7,500 km and a launched power of +7.6 dBm. The calculated results are shown in FIG. 5 where they are compared to the experimental results. Both sets of results are in close agreement, providing clear support that the present invention can model with reasonable accuracy a WDM transmission system that is subject to nonlinear penalties.

What is claimed is:

1. A method for determining system performance of an optical transmission system that supports an optical signal having a plurality of channels, said method comprising the steps of:

(i) selecting a set of parameters defining characteristics of the transmission system;

(ii) determining a baseline value of the system performance that accounts for fiber loss, optical amplifier gain and noise, and system gain equalization;

(iii) determining a first penalty to the baseline system performance arising from a nonlinear interaction between the optical signal and amplified spontaneous emission;

(iv) determining a second penalty to the baseline system performance arising from self-phase modulation and cross-phase modulation;

(v) subtracting the first and second penalties from the baseline system performance to obtain a value of system performance for the transmission system.

2. The method of claim 1 wherein the steps of determining the first and second penalties includes the step of determining relative power levels for the plurality of channels based on optical amplifier gain shape.

3. The method of claim 1 wherein the measure of system performance is a Q-factor.

4. The method of claim 1 wherein the set of parameters defining system characteristics include system length, bit rate, the number of amplifiers and channels employed, and the wavelengths of the channels and their respective power levels.

5. The method of claim 1 wherein the transmission system includes a plurality of spans each containing an optical amplifier and further wherein steps (i)–(v) are performed on a span by span basis.

6. The method of claim 1 wherein the baseline value of system performance further accounts for four-wave mixing among the information channels.

* * * * *